United States Patent [19]

Brist et al.

[11] Patent Number: 4,549,072
[45] Date of Patent: Oct. 22, 1985

[54] PROOFING OR HEATING CABINET

[75] Inventors: Kenneth Brist; Robert D. Klein, both of Fort Wayne, Ind.

[73] Assignee: Lincoln Manufacturing Company, Inc., Fort Wayne, Ind.

[21] Appl. No.: 455,001

[22] Filed: Jan. 3, 1983

[51] Int. Cl.$^4$ .................. F27D 11/00; F24H 3/04; H05B 1/00
[52] U.S. Cl. ............................ 219/400; 219/386; 219/371; 219/375
[58] Field of Search ............... 219/400, 386, 387, 369, 219/370, 371, 367, 374, 375, 376; 126/21 R, 21 A; 165/DIG. 25, DIG. 26; 99/473–476; 34/225, 195–198

[56] References Cited

U.S. PATENT DOCUMENTS

| | | | |
|---|---|---|---|
| 1,171,059 | 2/1916 | Loguin | 338/304 |
| 2,172,059 | 9/1939 | Chilton | 34/196 |
| 2,318,027 | 5/1943 | Sykes | 34/196 |
| 2,396,455 | 3/1946 | Booth | 34/196 |
| 3,199,579 | 8/1965 | Foster | 219/521 |
| 3,861,378 | 1/1975 | Rhoads | 219/400 |
| 3,895,215 | 7/1975 | Gordon | 219/400 |
| 4,030,476 | 6/1977 | Hock | 219/400 |
| 4,401,883 | 8/1983 | Watson | 219/375 |

FOREIGN PATENT DOCUMENTS

| | | | |
|---|---|---|---|
| 2213702 | 10/1973 | Fed. Rep. of Germany | 99/473 |
| 1476119 | 6/1977 | United Kingdom | 99/474 |

Primary Examiner—Roy N. Envall, Jr.
Assistant Examiner—Teresa J. Walberg
Attorney, Agent, or Firm—Albert L. Jeffers; John F. Hoffman

[57] ABSTRACT

A proofing or heating cabinet is provided having an enclosure with an interior and a pair of oppositely disposed side walls forming elongate heat ducts therein; the heat ducts having openings in their mutually facing surfaces. A modular heating assembly is removably disposed in the enclosure and has aligned end openings communicating with the heat ducts. Placed within the modular heating assembly at one end opening thereof is an electric heating element extending substantially thereacross, and at the other end thereof a blower device substantially extending thereacross to maintain generally laminar the airflow through the modular assembly.

8 Claims, 7 Drawing Figures

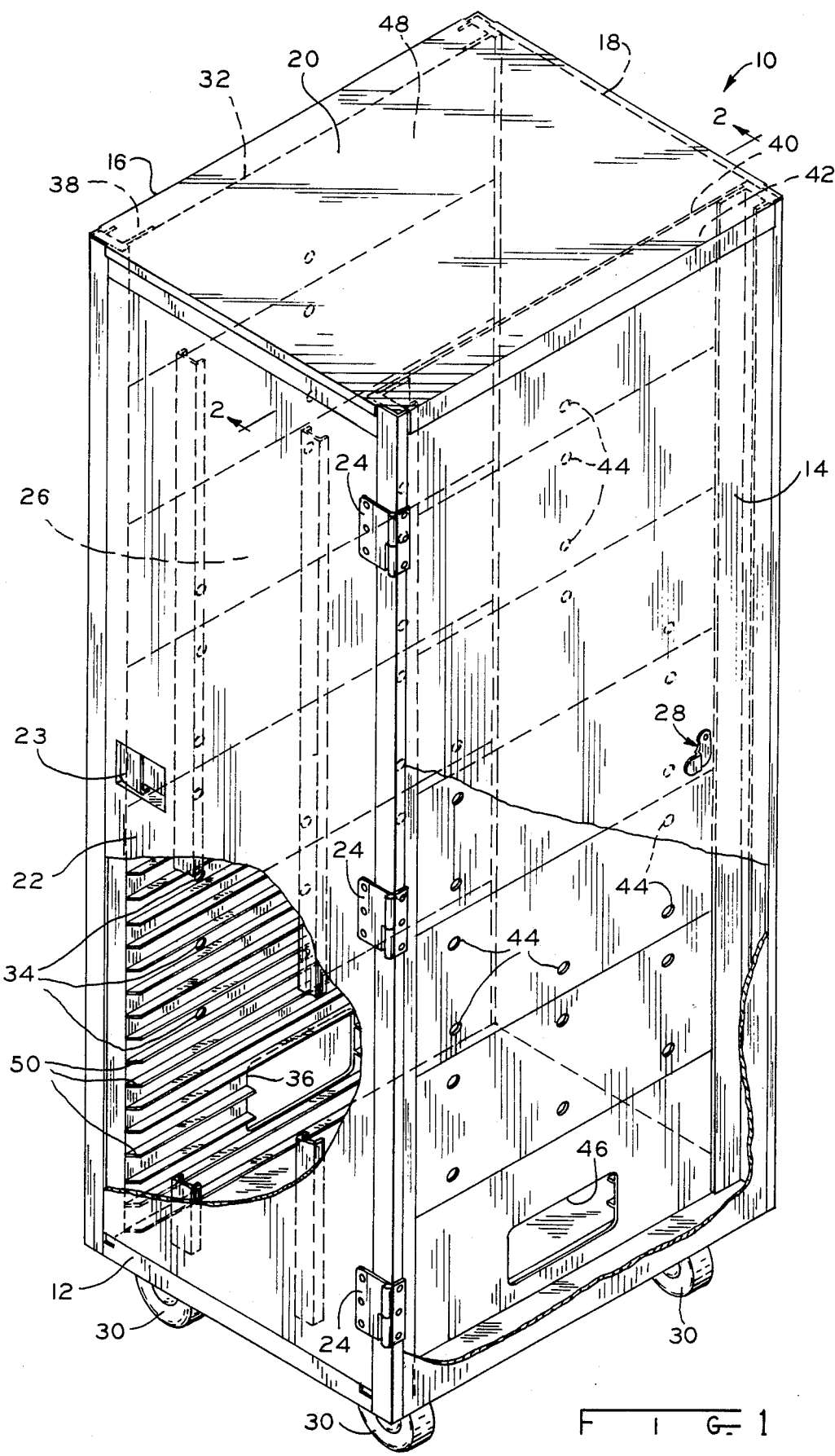

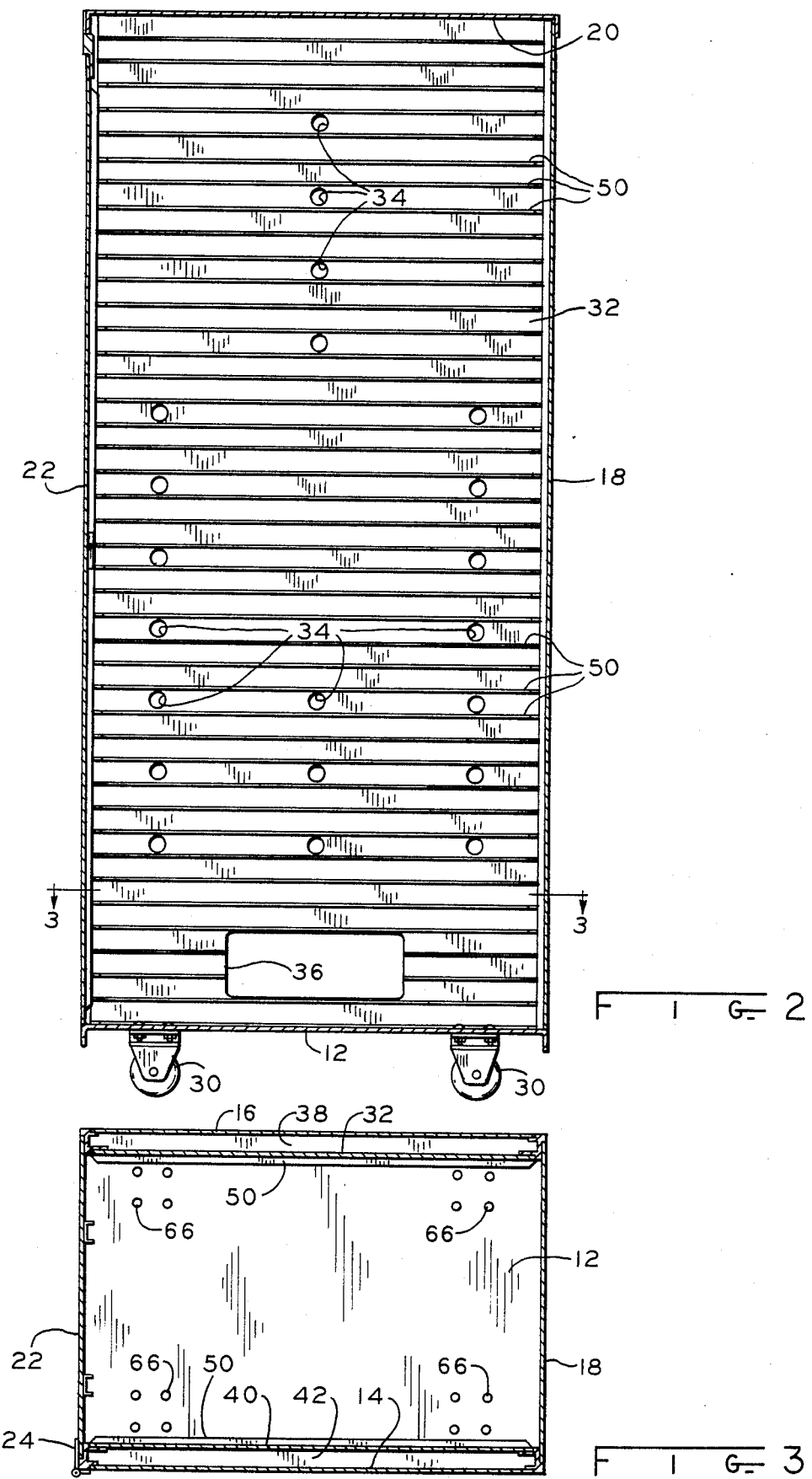

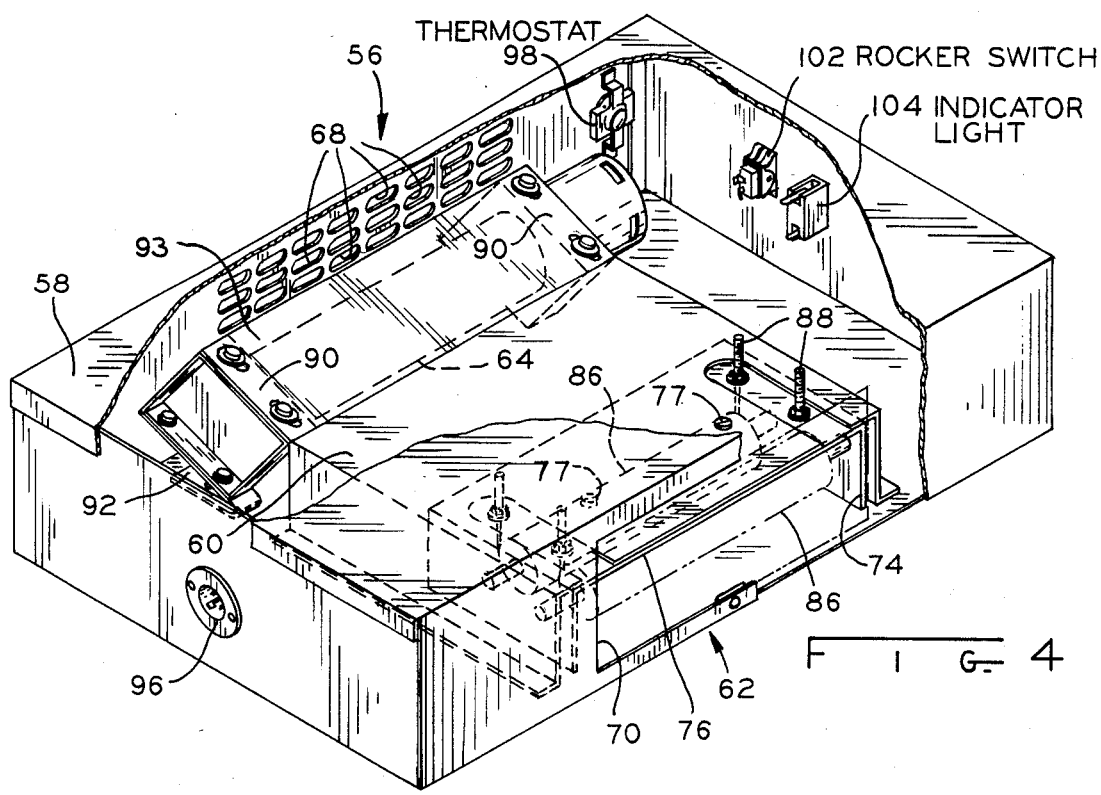
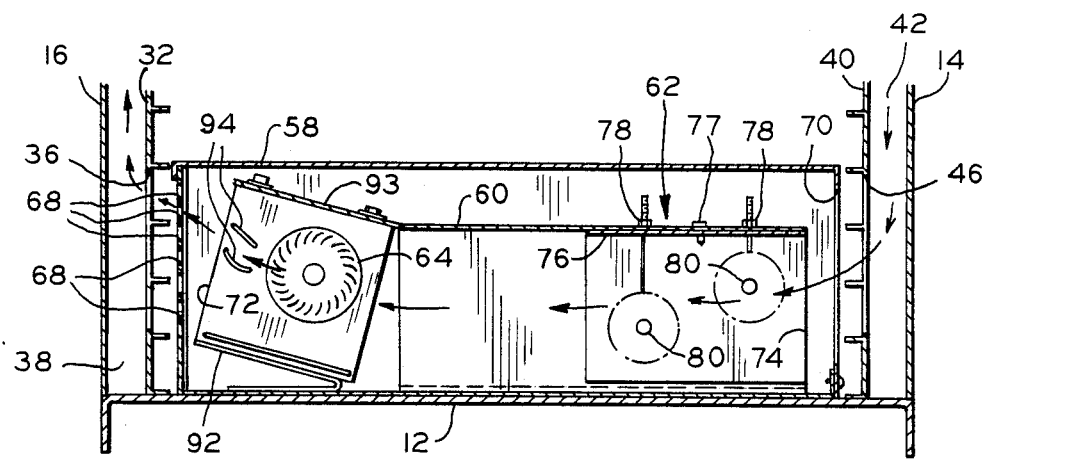
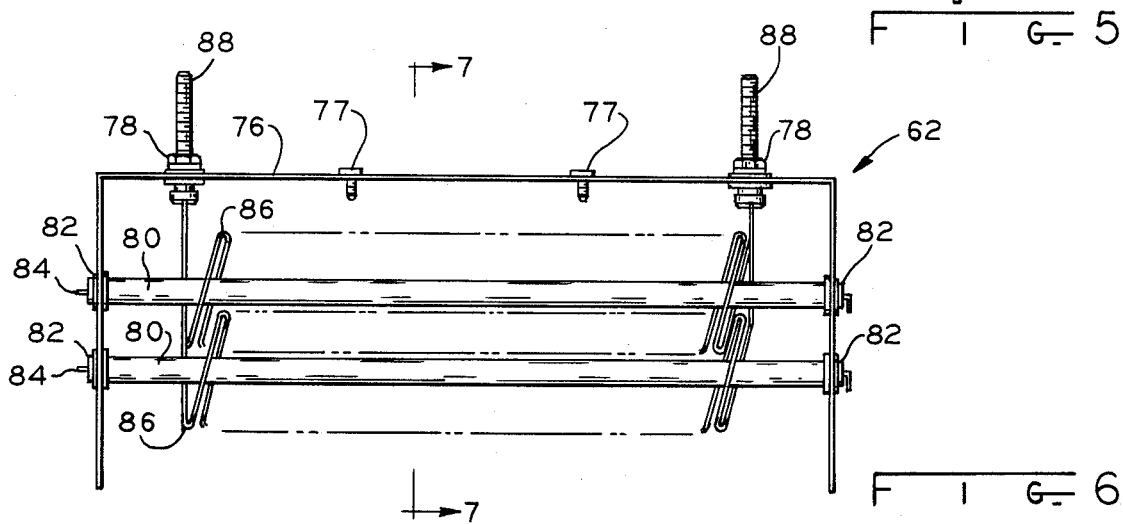

PROOFING OR HEATING CABINET

BACKGROUND OF THE INVENTION

This invention pertains to a heating cabinet for proofing dough or maintaining foods at a desired temperature, and more particularly to an improved heating assembly for the proofing or heating cabinet.

Various types of proofing cabinets are available today and most generally comprise a housing defining an interior, an air circulation system, a heating device, and a blower device. The primary purpose of these proofing cabinets is to proof dough prior to baking, to maintain cooked food at a predetermined temperature or to raise precooked food to a serving temperature. In most, the food is supported on shelves or trays in a vertical arrangement and the air heated by the heating device is delivered through the air circulation system to the food by the blower device.

A continuing problem associated with these proofing cabinets is the irregular temperature distribution within the housing interior in which the food is located. For example, the food nearest the heating device tends to experience higher temperatures than the food further away, and in some instances the attempts to rectify this irregular temperature distribution is unsatisfactory due to the inefficient heating of the air by the heating and blower devices. In other words, attempts to better regulate the temperature distribution within the housing interior may result in a lower temperature distribution therein. Naturally, this may be corrected by increasing the heat output of the heating device to compensate for any inefficiency thereof, but this results in higher costs in energy consumption.

Other attempts in correcting irregular temperature distribution within the housing interior to avoid having to increase the heat output of the heating device have generally comprised variations in the structure of the air circulation system. Although the non-uniformity of the temperature distribution may be decreased in this manner, especially when used in conjunction with an increase in heat output of the heating device, there still exists a need for a more efficient means of heating the air to be recirculated.

SUMMARY OF THE INVENTION

The present invention offers as a solution to the problem of non-uniform temperature distribution a proofing or heating cabinet having specially designed heat ducts and a modular heating assembly therefor.

The heating assembly is preferably designed to draw air to be heated from one of the heat ducts across elongate heating elements in a substantially laminar flow pattern having a transverse cross-section of substantially rectangular shape. Since the transverse shape of the airflow pattern simulates the surface projection presented to it by the heating elements, there is uniform airflow over the complete lengths of the heating elements resulting in more efficient heating of the air per BTU supplied.

In a like manner, the blower device is designed to supply the heated air to one of the heat ducts without substantially altering the shape of the airflow pattern and to maintain the airflow as laminar as practical.

The heating device and the blower device of the present invention are contained within a removable modular heating tunnel to operate as a unit, thereby more efficiently heating the air and maintaining the airflow pattern therein. Further, the modular design of the heating assembly allows it to be easily removed for maintenance or replaced with an entirely new modular heating assembly.

One form of the present invention provides a proofing or heating cabinet comprising an enclosure having an interior and a pair of oppositely disposed side walls which form vertically elongate heat ducts therein. The heat ducts communicate with the interior of the enclosure through openings in their mutually facing surfaces. Removably disposed in the enclosure is a modular heating tunnel having aligned end openings communicating with respective ones of the heat ducts. In the modular heating tunnel at one of its end openings is an electric heating element that substantially extends across the width of the opening, and a blower device in the tunnel at the other end opening substantially extending across the width thereof. Since the blower device extends the width of the end opening, air drawn by the blower device from the interior through one of the heat ducts and into and through the tunnel is maintained in a substantially laminar flow as it passes through the tunnel and into and through the other heat duct to the interior of the enclosure.

Accordingly, it is one of the objects of the present invention to provide an improved modular heating assembly for proofing or heating cabinets for maintaining foods at uniformly controlled temperatures.

BRIEF DESCRIPTION OF THE DRAWINGS

The above mentioned and other features and objects of the present invention, and the manner of attaining them will become more apparent and the invention itself will be better understood by reference to the following description of an embodiment of the invention taken in conjunction with the accompanying drawings, wherein:

FIG. 1 is a broken away perspective view of a preferred embodiment of the present invention with the modular heating assembly removed;

FIG. 2 is a sectional view of FIG. 1 taken along line 2—2 and viewed in the direction of the arrows;

FIG. 3 is a sectional view of FIG. 2 taken along line 3—3 and viewed in the direction of the arrows;

FIG. 4 is a broken away perspective view of a modular heating assembly of the present invention;

FIG. 5 is a cross sectional view of the lower portion of the proofing cabinet incorporating the modular heating assembly of FIG. 4;

FIG. 6 is an elevational view of the heating elements; and

DESCRIPTION OF A PREFERRED EMBODIMENT

Figure 7:
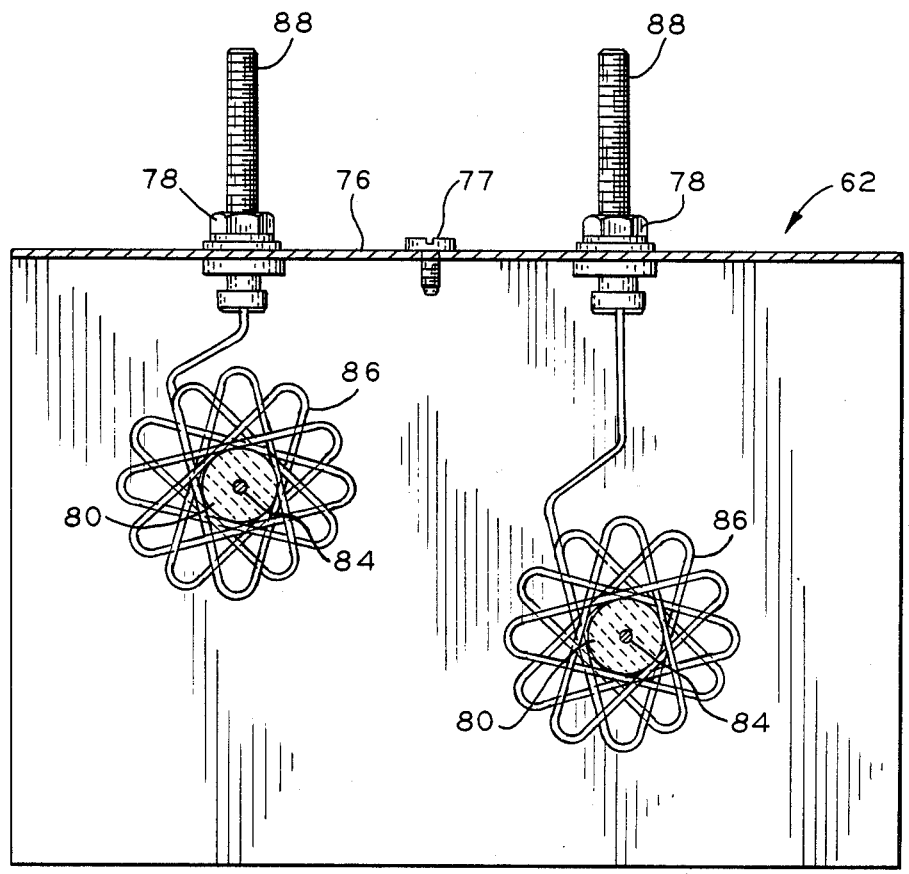
FIG. 7 is a sectional view of a FIG. 6 taken along line 7—7 and viewed in the direction of the arrows.

Referring to FIGS. 1–3, proofing or heating cabinet 10 comprises base 12, opposite side walls 14,16, back wall 18, and top 20. Door 22 is connected to side wall 14 by hinges 24, and when closed by means of handle 23 defines interior 26. Door stop 28 is attached to wall 14. Four casters 30 are connected to the bottom surface of base 12 to permit cabinet 10 to be easily moved.

Mounted within interior 26 and spaced apart from wall 16 is interior wall 32, which has an arrangement of openings 34 selectively disposed therein and inlet 36 disposed in its bottom portion. Walls 16 and 32 substantially form therebetween heat duct 38.

Similarly, wall 14 has mounted in spaced apart relation thereto interior wall 40 to define therebetween exhaust duct 42. Exhaust duct 42 has an arrangement of openings 44 therein, which are axially aligned with respective openings 34 in interior wall 32, and outlet 46 in its bottom portion in direct facing relationship with inlet 36.

Enclosure 48 is formed by walls 32,40, base 12, and top 20, and contains a vertical arrangement of shelves or trays (not shown) on which food products may be placed. Support for the trays is provided by a plurality of horizontal support flanges 50 on interior walls 32,40.

Referring to FIGS. 4–7, modular heating assembly 56 comprises housing 58 containing heating tunnel 60, heating element device 62, and centrifugal blower 64. Housing 58 is supported on base 12 (FIG. 3); holes 66 being used to connect casters 30 to base 12. Housing 58 has a plurality of openings 68 and a single opening 70 for communicating with heat duct 38 and exhaust duct 42, respectively. Heating tunnel 60 communicates with heat duct 38 and exhaust duct 42 through its end openings 72,74, respectively, and openings 68,70, respectively.

Continuing to refer to FIGS. 4–7, heating element device 62 comprises support frame 76 connected to heating tunnel 60 by screws 77, threaded ceramic rods 80 transversely supported across support frame 76 by ceramic bushings 82 and support wires 84 received through ceramic bushings 82, and open wire heating elements 86. One of the most unique features of heating assembly 56 is the particular type of heating elements 86 used therein. To the best of applicant's knowledge, these particular type heating elements 86 have not been used before in proofing cabinets. Heating elements 86 are open wire resistance-type made of alloy steel material and are wound or arranged about ceramic rods 80 in a corolla-like arrangement, as may be seen in FIG. 7. Because of this corolla-like arrangement and the use of open wire resistance-type heating elements 86, when power is applied to heating elements 86 at terminals 88, which are secured by bushings 78, airflow directed across heating elements 86 is most efficiently heated due to maximum exposure of the air to heated surfaces of elements 86. Uniform, efficient heating of airflow in this manner is particularly advantageous in the operation of proofing cabinet 10 in maintaining a controlled temperature within enclosure 48 with minimum expenditure of energy.

Alternatively, a self-supporting spiral wound cylindrical sheath-type heating element could be used.

In a typical working embodiment of modular heating assembly 56, the widths of inlet 36, outlet 46, and heating elements 86 are approximately eight inches, however, due to the corolla-like arrangement of heating elements 86, each element 86 has a total length of twenty-four feet within the eight inch dimension. These dimensions are only exemplary and not intended to be limitative of the invention, and are presented only to illustrate the uniqueness of using open wire resistant type heating elements 86 arranged in a corolla-like manner.

As earlier mentioned, ceramic rods 80 are threaded and are preferably made of a CORDIERITE material.

Referring now to FIGS. 4 and 5, centrifugal blower 64 is mounted in tunnel 60 by end caps 90, and is angularly oriented approximately 15° by blower support 92.

Blower 64 is bolted to a plate-like extension 93 of tunnel 60. The angular orientation eliminates a 90° impingement of airflow against wall 16, which would create undesirable turbulence and airflow, and assists in directing the airflow upwardly through heat duct 38. Vanes 94 extending across tunnel 60 also assist in initiating an upward flow of heated air through openings 72,68, and inlet 36.

Blower 64 is selected so that it extends substantially the width of openings 72,68 and inlet 36, and a typical embodiment of centrifugal blower 64 may be model No. 7021-5554 manufactured by Fasco Industries, Cassville, Mo.

Referring to FIG. 4, modular heating assembly 56 is provided with motor base 96, thermostat 98, rocker switch 102, and indicator light 104 for the operation thereof.

In operation, blower 64 draws air from exhaust duct 42 through outlet 46 and openings 70,74 into tunnel 60. The airflow is drawn across heating elements 86 to be uniformly heated thereby, and then drawn through tunnel 60, through blower 64 and openings 72,68 and inlet 36 into heat duct 38. Because openings 70,74, 68 and 36 are aligned, the airflow is generally laminar, and the airflow efficiency of the system is high. The heated air is urged upwardly by blower 64 and convective assistance due to modular heating assembly 56 being mounted in the lower portion of cabinet 10. Since the airflow flows rapidly upwardly to the upper part of heat duct 38, a greater pressure exists in the upper part. To compensate for this so that the airflow rates across the vertical arrangement of trays (not shown) of food are substantially equal, openings 34 in interior wall 32 decrease in number from bottom to top as illustrated in FIG. 2. Alternatively, the total cross-sectional areas of openings 34 could be decreased from bottom to top to compensate for the greater pressure existing in the upper portion of heat duct 38, thereby providing substantially equal flow rates of heated air at the various tray levels within enclosure 48. The heated air is then horizontally directed across the trays of food and through openings 44 in interior wall 40 for subsequent passage downwardly through exhaust duct 42 and to outlet 46 for reheating.

By providing modular heating assembly 56 with a substantially enclosed tunnel 60 containing heating element device 62 and blower 64, and a decreasing number of openings 34 in interior wall 32, heating of the airflow is more efficiently accomplished, and the maintaining of a uniformly controlled temperature within enclosure 48 is likewise accomplished more efficiently, with an accompanying decrease in energy consumption.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A proofing cabinet, comprising:
   an enclosure having an interior, a pair of oppositely disposed side walls and a pair of oppositely disposed interior walls, said side walls and interior walls forming a plurality of vertically elongate heat ducts therebetween, said heat ducts communicating with said interior through openings in their mutually facing surfaces and having respective aligned duct openings in said mutually facing surfaces, a modular heating tunnel being removably disposed in said enclosure and having aligned end openings communicating with respective ones of said heat ducts through their respective said duct openings, said end openings and said duct openings being aligned with each other, said duct openings decreasing along the length of said heat ducts in a direction away from said tunnel, electric heating element means in said modular heating tunnel at one of said end openings, said electric heating element means substantially extending across the width of said one end opening and presenting a large heating surface area therein, and blower means in said modular heating tunnel at the other said end opening and substantially extending across the width of said other end opening for uniformly drawing air from said interior through one of said heat ducts into said modular heating tunnel and across said electric heating element means to be heated thereby, and uniformly urging the flow of heated air through said modular heating tunnel into and through the other said heat duct and horizontally across said interior, said blower means secured to an angled support member connected to said tunnel for angling said blower means upwardly to direct said heated flow of air urged by said blower upwardly into the other said heat duct, whereby the air flow though said tunnel and ducts is maintained substantially laminar by said modular heating tunnel, the alignment of said end openings and said duct openings and said angled blower means, and is uniformly heated by said large heating surface area of said electric heating element means, thereby providing more efficient heating of the air flow per unit of heat energy supplied and substantially equal flow rates of heated air across said enclosure interior.

2. The cabinet of claim 1 wherein said blower means is positioned in said tunnel to first draw air across said heating element means and thereafter through said tunnel into said other heat duct.

3. The cabinet of claim 1 wherein said tunnel is disposed in the bottom portion of said enclosure and said heat ducts extend upwardly from said tunnel to convectively assist the flow of air.

4. The cabinet of claim 1 wherein said electric heating element means is an open wire resistance type shaped in an elongate arrangement having a transverse cross-section of corolla-like form.

5. The cabinet of claim 4 further including a second heating element means identical to said first mentioned heating element means and being disposed substantially parallel to and in vertically staggered relationship with said first mentioned heating element means.

6. A proofing cabinet comprising:
an enclosure having an interior, a pair of oppositely disposed side walls and a pair of oppositely disposed interior walls, said side walls and interior walls forming vertically elongate heat ducts with a plurality of vertically spaced openings in their mutually facing surfaces said spaced openings decreasing along the length of said heat ducts in an upward direction, and aligned air duct inlet and outlet openings in the lower portions of said pair of interior walls, respectively, and communicating with said ducts, a modular heating assembly removably mounted in the lower portion of said enclosure comprising an air flow tunnel having aligned end openings communicating with respective ones of said heat ducts, electric heating element means in said air flow tunnel at one of said end openings and extending substantially thereacross and presenting a large heating surface area therein, and blower means in said air flow tunnel at the other said end opening and extending substantially thereacross to maintain a flow of air through said air flow tunnel, and upwardly directed vane means in said tunnel downstream of said blower means for laminarly directing the flow of heated air upwardly through one of said ducts, said tunnel end openings being aligned respectively with said air duct inlet and outlet openings, whereby the air flow in said tunnel is maintained substantially laminar by said modular heating tunnel and the alignment of said end openings and said duct openings, and is uniformly heated by said large heating surface area of said electric heating element means, thereby providing more efficient heating of the air flow per unit of heat energy supplied.

7. The assembly of claim 6 wherein said electric heating element means is an open wire resistance type shaped in an elongate arrangement having a transverse cross-section of corollar-like form.

8. The assembly of claim 7 further including a second heating element means identical to said first mentioned heating element means and being substantially parallel to and in vertically staggered relationship with said first mentioned heating element means.

* * * * *